United States Patent
Brand

(10) Patent No.: US 11,212,895 B2
(45) Date of Patent: Dec. 28, 2021

(54) CONTROL METHOD AND SYSTEM FOR A LUMINAIRE, AND LUMINAIRE COMPRISING SUCH A CONTROL SYSTEM

(71) Applicant: Schreder S.A., Brussels (BE)

(72) Inventor: Daniel Brand, Wedemark (DE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 16/758,379

(22) PCT Filed: Oct. 17, 2018

(86) PCT No.: PCT/EP2018/078414
§ 371 (c)(1),
(2) Date: Apr. 22, 2020

(87) PCT Pub. No.: WO2019/081305
PCT Pub. Date: May 2, 2019

(65) Prior Publication Data
US 2020/0344864 A1    Oct. 29, 2020

(30) Foreign Application Priority Data

Oct. 24, 2017 (BE) .................................. 2017/5760

(51) Int. Cl.
*H05B 47/11* (2020.01)
*H05B 45/12* (2020.01)
*H05B 47/16* (2020.01)

(52) U.S. Cl.
CPC ............. *H05B 47/11* (2020.01); *H05B 45/12* (2020.01); *H05B 47/16* (2020.01)

(58) Field of Classification Search
CPC ...................................................... H05B 47/11
See application file for complete search history.

(56) References Cited

U.S. PATENT DOCUMENTS

| | | | |
|---|---|---|---|
| 2012/0181938 A1* | 7/2012 | Kay | H05B 47/11 315/159 |
| 2014/0028198 A1* | 1/2014 | Reed | H05B 47/16 315/152 |

(Continued)

OTHER PUBLICATIONS

PCT International Search Report and Written Opinion, PCT International Application No. PCT/EP2018/078414, dated Dec. 19, 2018.

*Primary Examiner* — Alexander H Taningco
*Assistant Examiner* — Pedro C Fernandez
(74) *Attorney, Agent, or Firm* — McDonnell Boehnen Hulbert & Berghoff LLP

(57) ABSTRACT

A control method for a luminaire with a daylight sensor, comprising: obtaining a first value ($\alpha$) representative for the angle of the sun with respect to the horizon; if the obtained first value is within a first predetermined range corresponding with a dusk or dawn range, performing the following steps: obtaining a second value ($E_v$) representative for a light level using the daylight sensor of the luminaire; and controlling the switching on or off of the luminaire when the obtained second value ($E_v$) fulfils a first predetermined criterion; registering over time, for at least one determined obtained second value, at least one corresponding obtained first value ($\alpha$); and/or, for at least one determined first value, at least one corresponding obtained second value ($E_v$); adjusting the first predetermined criterion based on the registrations over time.

21 Claims, 4 Drawing Sheets

(56) References Cited

U.S. PATENT DOCUMENTS

| | | | |
|---|---|---|---|
| 2014/0028199 A1* | 1/2014 | Chemel | H05B 47/105 |
| | | | 315/152 |
| 2014/0292208 A1* | 10/2014 | Chemel | H05B 47/16 |
| | | | 315/154 |
| 2016/0073467 A1* | 3/2016 | McDonald | H05B 45/10 |
| | | | 315/151 |
| 2016/0286616 A1* | 9/2016 | van de Ven | H05B 47/16 |
| 2017/0171941 A1* | 6/2017 | Steiner | H05B 47/11 |
| 2017/0277149 A1* | 9/2017 | Huang | G01J 1/18 |

* cited by examiner

CONTROL METHOD AND SYSTEM FOR A LUMINAIRE, AND LUMINAIRE COMPRISING SUCH A CONTROL SYSTEM

CROSS-REFERENCE TO RELATED APPLICATION

The present application is a national stage entry of PCT/EP2018/078414 filed on Oct. 17, 2018, which claims priority to BE 20175760 filed on Oct. 24, 2017, the contents of each of which are hereby incorporated by reference.

FIELD OF THE INVENTION

The field of the invention relates to a control method and system for a luminaire with a daylight sensor configured for measuring a light level of daylight at dusk and dawn, and to a luminaire comprising such a control system.

BACKGROUND OF THE INVENTION

It is known to provide a control system for a luminaire in order to control automatically the switching on and off of the luminaire at dusk and dawn. The control system comprises a day light sensor, such as a photodiode, for measuring a light level of daylight at dusk and dawn. Further it is known to obtain an angle of the sun with respect to the horizon in the control system. The control system performs a controlling of the switching on/off e.g. when the angle is within a configurable window of elevation, such as a window between 0° and −3°, and based on whether the measured light level fulfills certain criteria.

US 2017/0277149 discloses a control device with automatic adjustment including: an ambient light illumination sensor for sensing ambient light illumination information; and a microcontroller unit coupled to the ambient light illumination sensor. The microcontroller unit analyzes respective ambient illumination information at each of a plurality of time sessions. The microcontroller unit controls a controlled device based on the respective ambient illumination information at the time sessions.

SUMMARY OF THE INVENTION

The object of embodiments of the invention is to improve the controlling of the switching on and off of a luminaire, and more in particular to perform a type of self-calibration such that the switching on and off of a luminaire can be done accurately over longer periods of time.

According to a first aspect there is provided a control method for a luminaire with a daylight sensor configured for measuring a light level of daylight at dusk and dawn, comprising:

obtaining a first value ($\alpha$) representative for the angle of the sun with respect to the horizon (2001);

if the obtained first value is within a first predetermined range corresponding with a dusk range or a dawn range, performing the following steps:

obtaining a second value ($E_v$) representative for a light level using the daylight sensor of the luminaire;

controlling the switching on or off of the luminaire when the obtained second value ($E_v$) fulfils a first predetermined criterion;

registering over time, for at least one determined obtained second value ($E_v = E_{v1}$), at least one corresponding obtained first value ($\alpha$); and/or, for at least one determined first value ($\alpha = \alpha 1$), at least one corresponding obtained second value ($E_v$);

adjusting the first predetermined criterion based on the registrations over time.

Embodiments of the invention are based inter alia on the insight that the measured values by the daylight sensor may not be accurate anymore after a certain period of time due to e.g. aging of the light sensor, degrading of a material of a transparent cover of the housing in which the light sensor is provided, etc. In other words, after a certain period of time, the daylight sensor may measure a value of e.g. 50 lux whilst the actual light value is 60 lux. In prior art solutions this is not taken into account when controlling the switching on and off of the luminaire and will result in the luminaire being switched on too early and switched off too late, after a certain period of time. To address this problem the method of the invention registers over time, for at least one determined obtained second value, at least one corresponding obtained first value; and/or, for at least one determined first value, at least one corresponding obtained second value; and adjusts the first predetermined criterion based on the registrations over time. By performing a registration over time of either the light value for a certain value of the angle of the sun, or of the angle of the sun for a certain measured light value, the criterion for switching on/off the luminaire can be suitably adjusted to take into account the measurement errors due to e.g. aging of the daylight sensor. By adjusting the criterion a self-calibration is performed so that the controlling can be done in an accurate manner over longer periods of time.

Preferred embodiments are disclosed in the dependent claims.

Preferably, the registering over time is done over a period which comprises a plurality of years, such that the first predetermined criterion is adjusted in function of a degradation of the daylight sensor over the years. In that manner an accurate controlling of the switching on/off of the luminaire can be performed for many consecutive years.

In an exemplary embodiment, the registering over time may comprise registering over time a corresponding obtained first value ($\alpha$), when the obtained second value ($E_v$) is equal to a predetermined value ($E_{v1}$) or when the obtained second value ($E_v$) is within a predetermined range.

In an exemplary embodiment the registering over time may be performed when predetermined weather conditions are fulfilled; and the adjusting is based on the values registered for the predetermined weather conditions.

Preferably, the registered second values or the registered first values are averaged over a period of time to obtain an average value ($E_{vav}$) or ($\alpha_{av}$), and the adjusting is based on changes of the average value over time. Preferably the period of time for the averaging is between 2 weeks and 4 months, more preferably between 1 and 4 months, even more preferably between 1 month and 3 months, and the adjusting is based on a shifting of the average value when comparing the average value of a present year with an average value of a previous year. In that manner similar periods of a year may be compared.

In a possible embodiment the averaging may be performed for a number of consecutive partially overlapping periods of time, wherein the period of time is preferably a multiple of a year.

In an exemplary embodiment the registering over time comprises registering at least once every 7 days, preferably at least once every 5 days, more preferably at least once every 2 days, and even more preferably daily. In that manner the amount of data will be sufficient to obtain a good self-calibration.

In an exemplary embodiment the first predetermined range is a configurable window with an upper limit and a lower limit located between 2° and −5°, e.g. a window between 0° and −3°.

In an exemplary embodiment controlling the switching on or off of the luminaire when the obtained second value ($E_v$) fulfils a first predetermined criterion comprises:
 switching on the luminaire when the obtained second value ($E_v$) is below a predetermined first threshold value ($E_{vt1}$); or
 switching off the luminaire when the obtained second value is above a predetermined second threshold value ($E_{vt2}$).

Preferably the adjusting of the first predetermined criterion comprises adjusting the first threshold value ($E_{vt1}$) in a range between 40 lux and 5 lux, preferably between 20 lux and 10 lux and/or adjusting the second threshold value ($E_{vt2}$) in a range between 75 lux and 40 lux, preferably between 70 lux and 45 lux, based on the registrations over time. In other words, the first predetermined criterion is that the second obtained value is above or below a threshold value ($E_{vt1}$, $E_{vt2}$), and the adjusting of the first predetermined criterion comprises adjusting the threshold value ($E_{vt1}$, $E_{vt2}$).

In an exemplary embodiment, the control method further comprises determining a correlation between the first value and the second value when the first value is within the first predetermined range, and the adjusting of the threshold value is further based on the determined correlation. In that manner the accuracy can be further improved.

Preferably, the daylight sensor is provided in the luminaire such that a light receiving surface of the daylight sensor is oriented facing the sky. In that manner a good measure for the light level of the daylight can be obtained.

In an exemplary embodiment, the luminaire comprises a GPS receiver; and the obtaining of the first value comprises computing the first value ($\alpha$) based on data received by the GPS receiver, e.g. localization data and a Time Sync data.

According to another aspect, there is provided a control system for a luminaire, comprising:
 a daylight sensor configured for measuring a second value ($E_v$) representative for a light level of daylight at dusk and dawn;
 a control device configured to obtain a first value ($\alpha$) representative for the angle of the sun with respect to the horizon; and to perform the following steps if the obtained first value is within a first predetermined range:
  obtaining a second value ($E_v$) from the daylight sensor;
  controlling the switching on or off of the luminaire when the obtained second value ($E_v$) fulfils a first predetermined criterion;
 said control device being further configured to register over time, for at least one determined obtained second value ($E_v = E_{v1}$), at least one corresponding obtained first value ($\alpha$); and/or, for at least one determined first value ($\alpha = \alpha 1$), at least one corresponding obtained second value ($E_v$);
 said control device being further configured for adjusting the first predetermined criterion based on the registrations over time.

The technical features and advantages set out above for the method apply mutatis mutandis for the control system and will therefore not be repeated here.

According to yet another aspect, the invention relates to a luminaire comprising an artificial light source, driving circuitry for driving the artificial light source, and a control system of any one of the embodiments disclosed above, wherein the control device is configured for controlling the switching on and off of the artificial light source by controlling the driving circuitry.

According to a further aspect of the invention, there is provided a computer device or other hardware device (such as a microprocessor unit) programmed to perform one or more steps of any one of the embodiments of the method disclosed above. According to another aspect, there is provided a data storage device encoding a program in machine-readable and machine-executable form to perform one or more steps of any one of the embodiments of the method disclosed above.

BRIEF DESCRIPTION OF THE DRAWINGS

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF THE DRAWINGS

Figure 1:
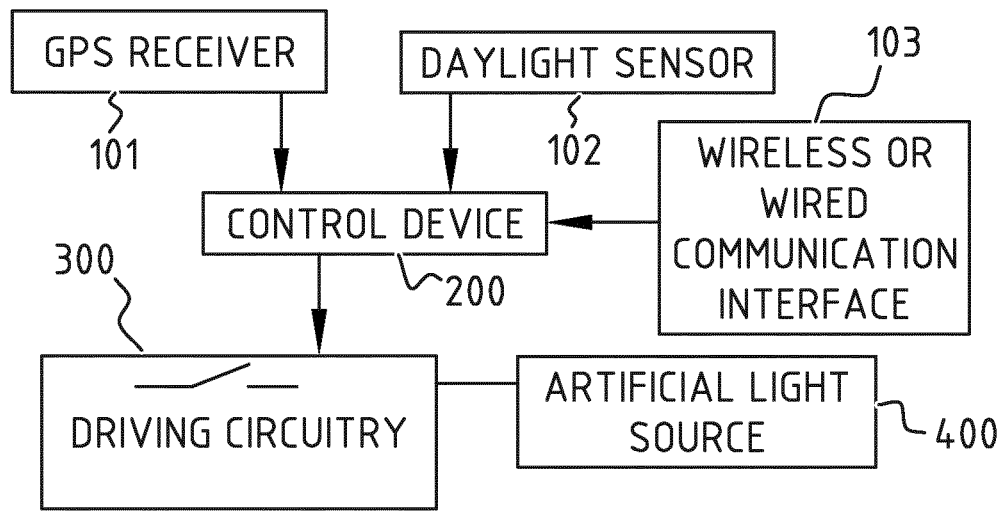
FIG. 1 is a schematic drawing of an exemplary embodiment of a control system for a luminaire.

The drawings are only schematic and are non-limiting. In the drawings, the size of some of the elements may be exaggerated and not drawn on scale for illustrative purposes. Any reference signs in the claims shall not be construed as limiting the scope. In the drawings, the same reference signs refer to the same or analogous elements.

FIG. 1 illustrates an exemplary embodiment of a control system for a luminaire, in accordance with the invention. The control system comprises a day light sensor 102, such as a photodiode; and a control device 200 configured to obtain a first value $\alpha$ representative for the angle of the sun with respect to the horizon. In the illustrated embodiment the control system comprises a GPS receiver 101, and the control device 200 is configured to compute the first value $\alpha$ representative for the angle of the sun based on data received by the GPS receiver 101. The data received from the GPS receiver may comprise localization data and a Time Sync data, and the control device 200 may compute the first value α representative for the angle of the sun based on the received localization data and a Time Sync data. The daylight sensor 102 is configured for measuring a second value $E_v$ representative for a light level (e.g. a Lux value) of daylight at dusk and dawn.

The control device 200 is configured to perform the following steps if the obtained first value is within a first predetermined range, wherein the first predetermined range may be a configurable window with a lower and upper limit which are located preferably between 2° and −5° (e.g. a window between 0° and −3°):
- obtaining a second value ($E_v$) from the daylight sensor;
- controlling the switching on or off of the luminaire when the obtained second value ($E_v$) fulfils a first predetermined criterion.

The controlling the switching on or off of the luminaire may be done by controlling driving circuitry 300 configured for driving an artificial light source 400 of the luminaire, e.g. a LED panel comprising a plurality of LEDs.

The first value is representative for the angle α of the sun with respect to the horizon. At dusk, when the angle of the sun dives below 0 degrees and the sun light decreases, it is desirable to switch on the luminaire. Similarly, at dawn, from a certain angle of the sun, it is desirable to switch off the luminaire. However, the weather conditions and the azimuth angle will influence the amount of sun light that is actually available, and typically the switching on/off of the luminaire is done based on both the angle of the sun and the light level of the available daylight.

Figure 4:
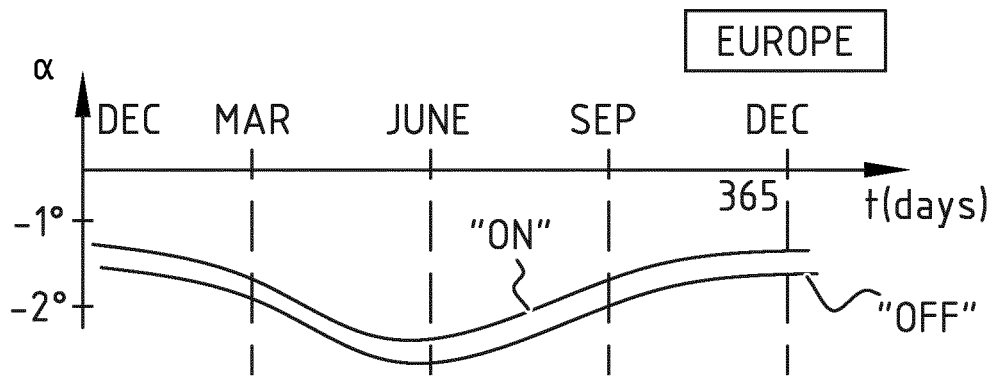
FIGS. 4-6 illustrate schematically three graphs of the angle of the sun with respect to the horizon in function of time illustrating ideal angles for switching on/off a luminaire; wherein in FIG. 4 the solar azimuth angle is taken into account for determining the ideal angle; wherein in FIG. 5 the solar azimuth angle and the weather conditions are taken into account for determining the ideal angle; and wherein in FIG. 6 it is illustrated how the curves shift upward with time if the calculation of the ideal angle is based on measured light level values as in the prior art (without self-calibration)

FIG. 4 illustrates schematically, for an exemplary location in Europe, the ideal angle of the sun to switch on the luminaire taking into account the azimuth angle, but not taking into account the weather conditions (i.e. assuming average weather conditions). Because of the azimuth angle, in summer, the luminaire can be switched on for a lower value of the angle of the sun, than in winter. Typically the ideal value for the angle of the sun for which the luminaire has to be switched on is about 1 degree lower in summer than in winter, with a yearly average value of about −2 degrees. Similarly, the ideal value for the angle of the sun for which the luminaire has to be switched off is typically about 1 degree lower in summer than in winter, with an average value of about −1.8 degrees. It is noted that this is merely a simplified example for an exemplary location in Europe, and that e.g. at the equator the curve will be straighter.

Figure 5:
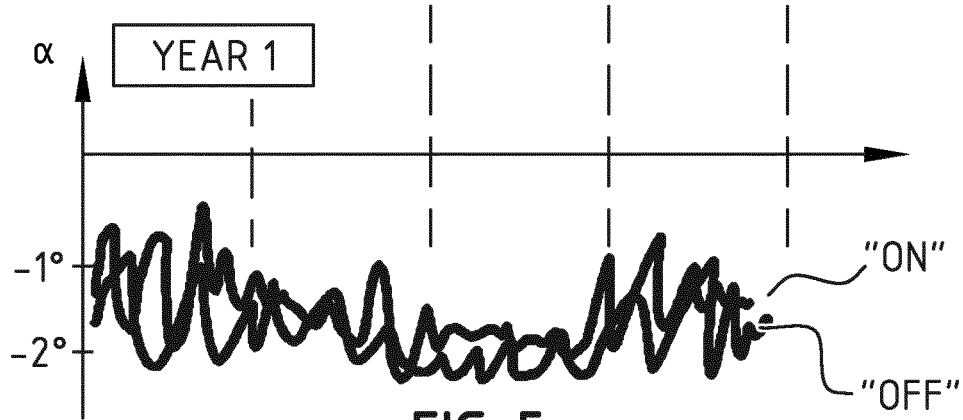

FIG. 5 illustrates schematically that the ideal angle of the sun will further depend on the weather conditions. On a bright day the switching on can be done later (lower angle of the sun) than on a cloudy day. Similarly, on a bright day the switching off can be done earlier (lower angle of the sun) than on a cloudy day. For that reason the daylight sensor 102 measures a second value $E_v$ representative for a light level of daylight at dusk and dawn, and the switching on and off of the luminaire is controlled by the control device 200 based on the obtained second value ($E_v$), and more in particular it is verified whether the obtained second value ($E_v$) fulfils a first predetermined criterion. The criterion could be e.g. below 16 lux for switching on of the luminaire and above 65 lux for switching off the luminaire. This exemplary criterion is conform to the standard ANSI C136.10-2010. However, the skilled person understands that depending on the geographical location of the luminaire and/or the application for which the luminaire is used other standards may apply.

Figure 6:
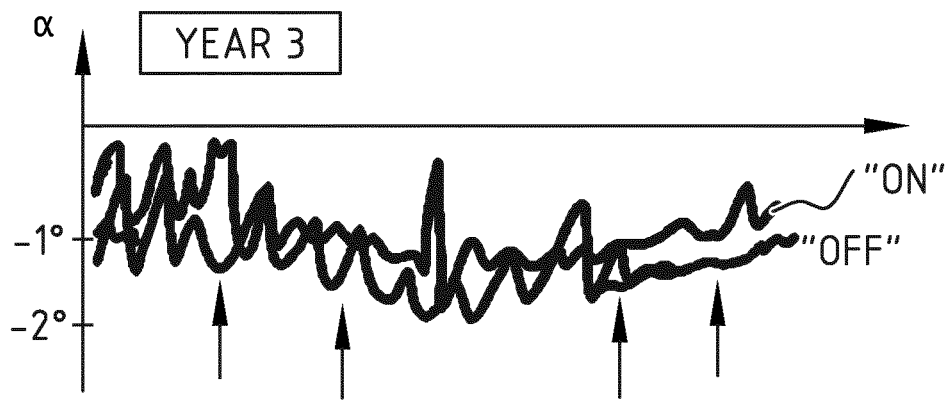

The inventors have discovered that the measured values by the daylight sensor may not be accurate anymore after a certain period of time due to e.g. aging of the light sensor, degrading of a material of a transparent cover of the housing in which the light sensor is provided, etc. In other words, after a certain period of time, the daylight sensor may measure a value of e.g. 50 lux whilst the actual light value is 60 lux. In prior art solutions this is not taken into account when controlling the switching on and off of the luminaire and will result in the luminaire being switched on too early and switched off too late, after a certain period of time. This is illustrated in the example of FIG. 6 where the ideal angle for switching on and off is plotted in function of time after the light sensor has been used for more than two years and wherein the calculation of the ideal angle is based on light level values measured by the daylight sensor without taking into account the ageing: compared to FIG. 5, the "ON" and "OFF" curves are shifted upward. In other words, in FIG. 6 it is illustrated how the curves shift upward with time if the calculation of the ideal angle is based on measured light level values as in the prior art.

To address this problem the control device 200 of the invention is further configured to register over time, for at least one determined obtained second value ($E_v=E_{v1}$), at least one corresponding obtained first value (α); and/or, for at least one determined first value (α=α1), at least one corresponding obtained second value ($E_v$). The control device 200 is further configured for adjusting the first predetermined criterion based on the registrations over time. By performing a registration over time of either the light value for a certain value of the angle of the sun, or of the angle of the sun for a certain measured light value, the criterion for switching on/off the luminaire can be suitably adjusted to take into account the measurement errors due to e.g. aging of the daylight sensor 102. This will be further explained below with reference to FIGS. 2 and 3.

In a particular embodiment the control device 200 is configured for performing the registering over a period of time of at least a plurality of years, and for adjusting the first predetermined criterion based on the registrations over said plurality of years such that a degradation of the daylight sensor over said plurality of years is taken into account. As the degradation is a slow process, it is preferred to do the registration over a longer period of time. In an exemplary embodiment, the values registered for a certain period, e.g. a quarter, of a present year may be compared with the values registered over the same period, e.g. the same quarter, of the previous year, for performing the adjusting (the self-calibration), as will be further explained below.

In a more advanced embodiment the control device is configured to obtain weather condition data and to perform the registering over time when the obtained weather condition data correspond to predetermined weather conditions; and to perform the adjusting based on the values registered for the predetermined weather conditions. To that end the control system may comprise a wireless or wired communication interface 103 through which the weather condition data can be received. The registration may be done e.g. when the weather condition data indicate that the sky is clear. In that manner it can be ensured that the changes in registered values are not due to the weather conditions but to a measurement error caused by e.g. aging of the daylight sensor 102, and that the adjustment of the first predetermined criterion can be done in an accurate manner.

According to another possible embodiment the control device is configured to average the registered second values or the registered first values over a period of time to obtain an average value ($E_{vav}$) or ($α_{av}$), and wherein the adjusting is based on changes of the average value over time. The period of time for the averaging may be e.g. between 1 and 4 months, and the adjusting is based on a shifting of the average value when comparing the average value of a present year with an average value of a previous year. By using average values variations due to changes in weather conditions can be filtered out, so that the adjustment of the first predetermined criterion can be done in an accurate manner.

According to another possibility, the averaging may be performed for a number of consecutive partially overlapping periods of time, wherein the period of time is preferably a multiple of a year. In other words, e.g. an average value for a first year in which the luminaire is used, may be compared with an average value of a second year in which the luminaire was used, and the first predetermined criterion may be adjusted based on a difference between the average value for the first year and the average value for the second year.

Figure 7:
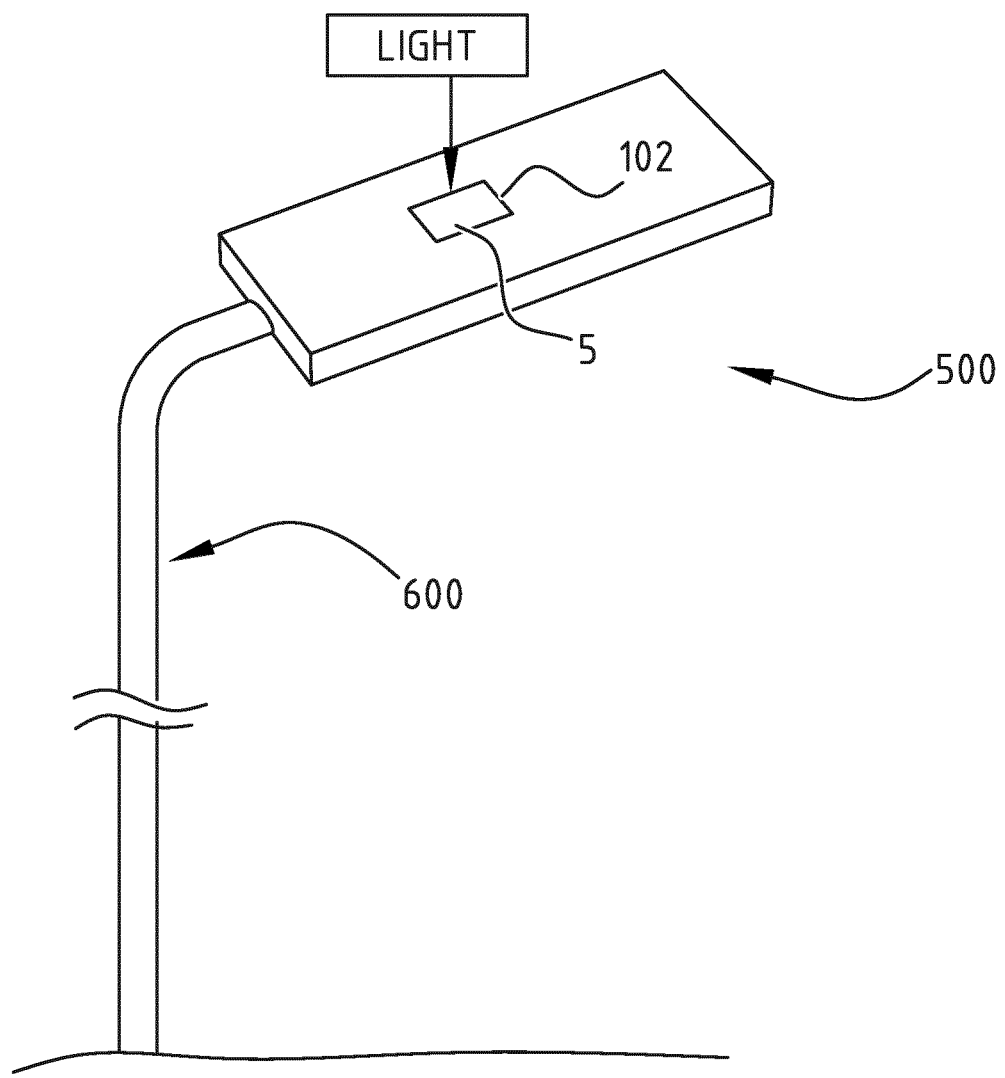
FIG. 7 illustrates a schematic perspective view of a lamp post with an exemplary embodiment of a luminaire according to the invention.

FIG. 7 illustrates a luminaire 500 provided on a lamp post 600. The daylight sensor 102 is provided in the luminaire 500 such that a light receiving surface S of the daylight sensor 102 is oriented facing the sky. In that manner daylight can be accurately sensed and the sensing of any "noise" light from terrestrial light sources can be limited.

Figure 2:
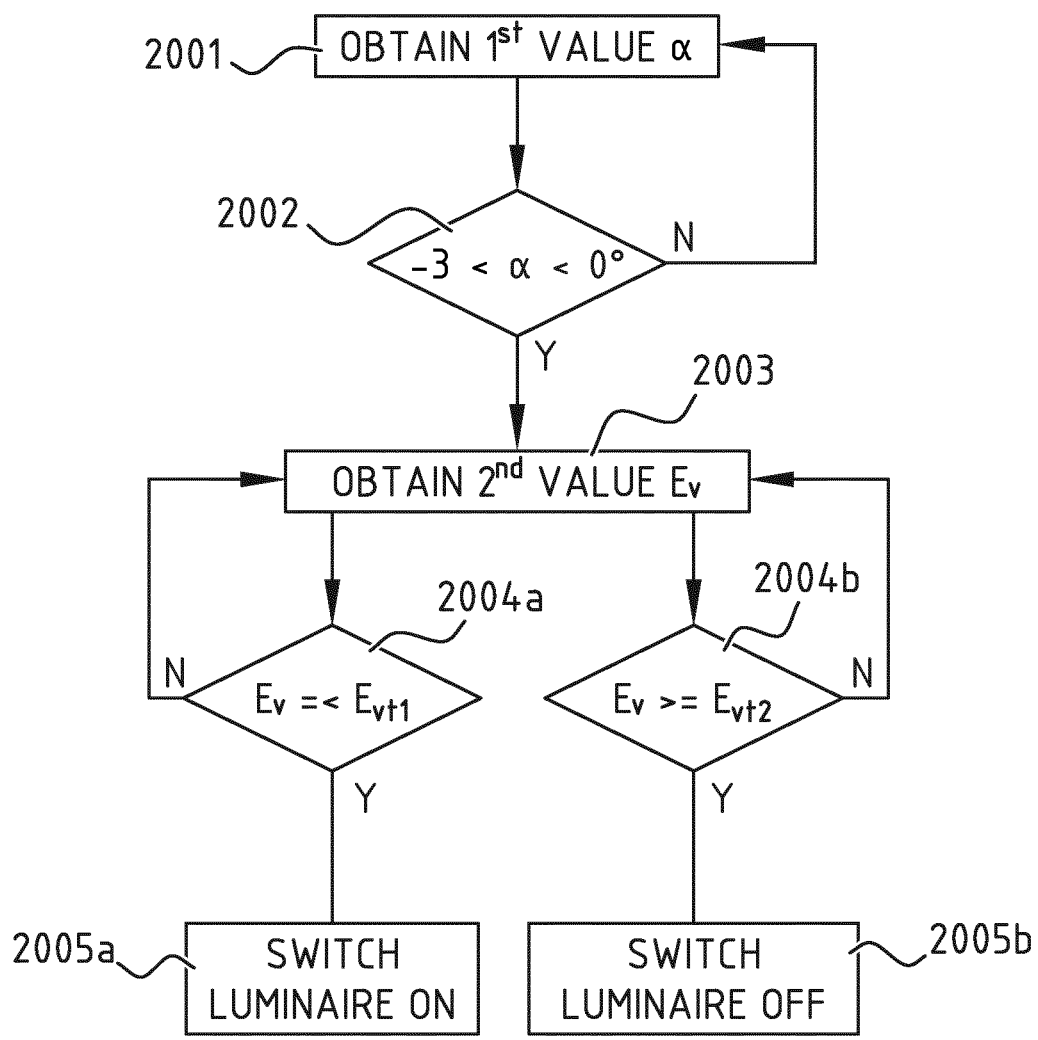
FIG. 2 is a flowchart illustrating an exemplary embodiment of a control method for a luminaire.

FIG. 2 illustrates a first exemplary embodiment of a control method for a luminaire with a daylight sensor configured for measuring a light level of daylight at dusk and dawn. The method comprises the following steps. In a first step 2001 a first value ($\alpha$) representative for the angle of the sun with respect to the horizon is obtained. In a second step 2002 it is verified if the obtained first value is within a first predetermined range corresponding with a dusk range or a dawn range, e.g. it is verified whether the first value ($\alpha$) is between 0° and −3°.

If this requirement is fulfilled, the method continues with step 2003. In step 2003 a second value ($E_v$) representative for a light level using the daylight sensor of the luminaire is obtained. In steps 2004a, 2004b, 2005a, 2005b the controlling of the switching is performed based on whether the obtained second value ($E_v$) fulfils a first predetermined criterion. In the illustrated embodiment this is done as follows. If in step 2004a it is determined that the obtained second value ($E_v$) is below a predetermined first threshold value ($E_{vt1}$), then the luminaire is switched on in step 2005a. If in step 2004b it is determined that the obtained second value ($E_v$) is above a predetermined second threshold value ($E_{vt2}$), then the luminaire is switched off in step 2005b. Depending on whether it is evening or morning, either steps 2004a, 2005a or steps 2004b, 2005b will be performed.

Figure 3:
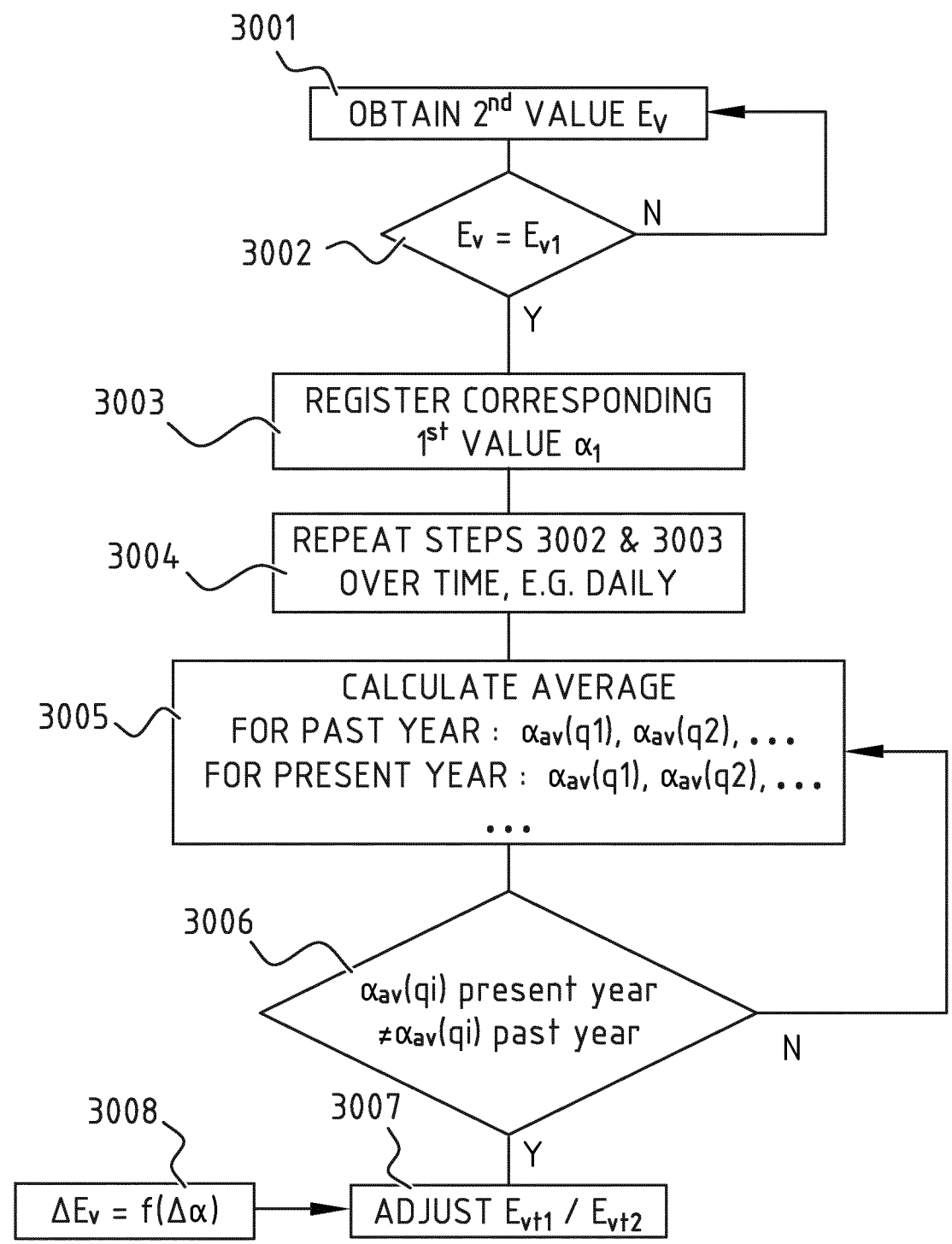
FIG. 3 is a flowchart illustrating another exemplary embodiment of a control method for a luminaire.

In embodiments of the invention the first threshold value ($E_{vt1}$) and the second threshold value ($E_{vt2}$) are adjusted in time based on knowledge about the degradation of the measurements performed by the daylight sensor. An exemplary embodiment on how to perform such an adjustment is illustrated in FIG. 3. In a first step 3001 a second value ($E_v$) representative for a light level using the daylight sensor of the luminaire is obtained. In a second step 3002 it is verified whether the obtained second value corresponds with a representative value $E_{v1}$. If that is the case, in step 3003, the corresponding obtained first value ($\alpha$) is registered. $E_{v1}$ could be e.g. a value in range around the normal value for which the luminaire is switched on, e.g. between 40 lux and 5 lux, preferably between 20 lux and 10 lux; or a value in range around the normal value for which the luminaire is switched off, e.g. between 75 lux and 40 lux, preferably between 70 lux and 45 lux. It is noted that the registering may also be done for two or more different representative values $E_{v1}$, to further improve the accuracy. The steps 3002 and 3003 are repeated over time, e.g. at least once every 7 days, preferably at least once every 5 days, more preferably at least once every 2 days, and even more preferably daily, see step 3004. Preferably the registering over time is done on a regular basis over a period which comprises a plurality of years, such that the first predetermined criterion can be adjusted in function of a degradation of the daylight sensor over the years, see further. Instead of performing the registering every day the registering over time may be performed only when predetermined weather conditions are fulfilled, e.g. only when the sky is bright.

In step 3005 the registered first values are averaged over a period of time to obtain an average value ($\alpha_{av}$). The period of time for the averaging may be between 1 and 4 months. For example, there may be obtained the following average values:

for the past year: an average value $\alpha_{av}(q1)$ for a first period of 4-8 weeks (e.g. 6 weeks) around 21 March, an average value $\alpha_{av}(q2)$ for a second period of 4-8 weeks (e.g. 6 weeks) around 21 June; an average value $\alpha_{av}(q3)$ for a third period of 4-8 weeks (e.g. 6 weeks) around 21 September; an average value $\alpha_{av}(q4)$ for a fourth period of 4-8 weeks (e.g. 6 weeks) around 21 December;

for the present year: an average value $\alpha_{av}(q1)$ for the first period, an average value $\alpha_{av}(q2)$ for the second period; an average value $\alpha_{av}(q3)$ for the third period; an average value $\alpha_{av}(q4)$ for the fourth period.

The skilled person understands that this is merely an example, and that the choice of the periods of time and the way of averaging may be defined in a different manner.

In step 3006 it is verified whether an average value for the present year is different from an average value for the previous year, i.e. is the average value $\alpha_{av}(q1)$ for the present year different from the average value $\alpha_{av}(q1)$ for the previous year? If that is the case, in step 3007, the threshold value ($E_{vt1}$) for switching on the luminaire and/or the threshold value ($E_{vt2}$) for switching off the luminaire are adjusted. In other words, the adjusting is based on a shifting of the average value when comparing the average value of a present year with an average value of a previous year.

In order to be able to perform an appropriate adjustment, a correlation between the first value ($\alpha$) and the second value ($E_v$) may be determined, e.g. for first values within the first predetermined range (e.g. between 2 and −5 degrees or between 0 and −3 degrees). For example, it may be determined that a change of the first value from −2.5° to −1.5° corresponds with a change of the second value of 4 lux, i.e. $E_v(\alpha=-1.5°) - E_v(\alpha=-2.5°) = 4$ lux; and that a change of the first value from −1.5° to −0.5° corresponds with a change of the second value of 16 lux, i.e. $E_v(\alpha=-0.5°) - E_v(\alpha=-1.5°) = 16$ lux. The adjusting of the threshold value can then be further based on the determined correlation data.

In further developed non-illustrated examples, the averaging may be performed for a number of consecutive partially overlapping periods of time, wherein the period of time is preferably a multiple of a year. For example, a first average may be calculated from January of the past year to January of the present year, a second average may be calculated from February of the past year to February of the present year, a third average may be calculated from March of the past year to March of the present year, etc. A change in average value may then be used for performing the adjusting.

The embodiment of FIG. 3 comprises registering over time, for at least one determined obtained second value ($E_v = E_{v1}$), at least one corresponding obtained first value ($\alpha$), see steps 3001-3004. In another non-illustrated embodiment the registering may comprise registering, for at least one determined first value ($\alpha=\alpha 1$), at least one corresponding obtained second value ($E_v$). The skilled person understands that the same principles set out above for the embodiment of FIG. 3 may be used in such an embodiment.

Other embodiments of the invention relate to a computer program comprising computer-executable instructions to perform one or more steps of the method, when the program is run on a computer, of any one of the preceding embodiments, e.g. the embodiment of FIG. 3.

Whilst the principles of the invention have been set out above in connection with specific embodiments, it is to be understood that this description is merely made by way of example and not as a limitation of the scope of protection which is determined by the appended claims.

The invention claimed is:

1. A control method for a luminaire with a daylight sensor configured for measuring a light level of daylight at dusk and dawn, comprising:
   (i) obtaining an angle of the sun with respect to the horizon;
   (ii) if the obtained angle of the sun is outside a first predetermined range corresponding with a dusk range or a dawn range, performing the following step:
      obtaining again an angle of the sun with respect to the horizon, wherein step (ii) is repeated until the obtained angle of the sun is within the first predetermined range;
   (iii) if the obtained angle of the sun is within the first predetermined range, performing the following steps:
      (iii-a) obtaining a light level using the daylight sensor of the luminaire; and
      (iii-b) controlling the luminaire when the obtained light level fulfils a first predetermined criterion that the obtained light level is above or below a threshold value,
   wherein step (iii-a) is repeated until the obtained light level fulfils the first predetermined criterion;
   (iv) registering, for at least one obtained light level, at least one corresponding obtained angle of the sun, wherein step (iv) is repeated over time to create a table of registered angles of the sun; and
   (v) adjusting the first predetermined criterion based on the registrations over time, wherein the adjusting of the first predetermined criterion comprises adjusting the threshold value.

2. The control method of claim 1, wherein the adjusting of the first predetermined criterion based on the registrations over time is done such that measurement errors of the measuring by the daylight sensor are taken into account.

3. The control method of claim 1, wherein the adjusting of the first predetermined criterion based on the registrations over time is done such that measurement errors due to aging of the daylight sensor are taken into account.

4. The control method of claim 1, wherein the registering over time is done over a period which comprises a plurality of years, such that the first predetermined criterion is adjusted in function of a degradation of the daylight sensor over the years.

5. The control method of claim 1, wherein the registering over time comprises registering over time a corresponding obtained angle of the sun, when the obtained light level is equal to a predetermined value or within a predetermined range.

6. The control method of claim 5, further comprising determining a correlation between the angle of the sun and the light level when the angle of the sun is within the first predetermined range, and wherein the adjusting of the threshold value is further based on the determined correlation.

7. The control method of claim 1, wherein the registering over time is performed when predetermined weather conditions are fulfilled, and wherein the adjusting is based on the values registered for the predetermined weather conditions.

8. The control method of claim 1, wherein the registered angles of the sun are averaged over a period of time to obtain an average value, wherein the adjusting is based on changes of the average value over time, wherein preferably the period of time for the averaging is between 2 weeks and 4 months, and wherein preferably the adjusting is based on a shifting of the average value when comparing the average value of a present year with an average value of a previous year.

9. The control method of claim 8, wherein said averaging is performed for a number of consecutive partially overlapping periods of time, wherein the period of time is preferably a multiple of a year.

10. The control method of claim 1, wherein the registering over time comprises registering at least once every 7 days, preferably at least once every 5 days, more preferably at least once every 2 days, and even more preferably daily.

11. The control method of claim 1, wherein the first predetermined range is a configurable window with an upper limit and a lower limit located between 2° and −5°.

12. The control method of claim 1, wherein the controlling of the luminaire comprises controlling the switching on or off of the luminaire when the obtained light level fulfils the first predetermined criterion, wherein preferably the controlling comprises:
   switching on the luminaire when the obtained light level is below a predetermined first threshold value; or
   switching off the luminaire when the obtained light level is above a predetermined second threshold value.

13. The control method of claim 12, wherein the first threshold value is adjusted in a range between 40 lux and 5 lux, preferably between 20 lux and 10 lux, and wherein the second threshold value is adjusted in a range between 75 lux and 40 lux, preferably between 70 lux and 45 lux.

14. A non-transitory computer-readable medium comprising computer-executable instructions to perform one or more steps of the method, when the program is run on a computer, of claim 1.

15. The control method of claim 1, wherein the registering over time comprises registering over time, for at least one determined angle of the sun, at least one corresponding obtained light level.

16. A control system for a luminaire, comprising:
   a daylight sensor configured for measuring a light level of daylight at dusk and dawn;
   a control device configured to (i) obtain an angle of the sun with respect to the horizon; to obtain again (ii) an angle of the sun with respect to the horizon if the obtained angle of the sun is outside a first predetermined range corresponding with a dusk range or a dawn range, wherein step (ii) is repeated until the obtained angle of the sun is within the first predetermined range; and to perform (iii) the following steps if the obtained first value is within the first predetermined range:
      (iii-a) obtaining a light level from the daylight sensor; and
      (iii-b) controlling the luminaire when the obtained light level fulfils a first predetermined criterion, wherein step (iii-a) is repeated until the obtained light level fulfils the first predetermined criterion;

said control device being further configured to (iv) register over time, for at least one obtained light level, at least one corresponding obtained angle of the sun, wherein step (iv) is repeated over time to create a table of registered angles of the sun; and said control device being further configured for (v) adjusting the first predetermined criterion based on the registrations over time, wherein the adjusting of the first predetermined criterion comprises adjusting the threshold value.

17. The control system of claim 16, wherein the control device is configured for any one or more of the following: for adjusting the first predetermined criterion based on the registrations over time, such that measurement errors of the measuring by the daylight sensor are taken into account; for adjusting of the first predetermined criterion based on the registrations over time, such that measurement errors due to aging of the daylight sensor are taken into account; for performing the registering over a period of time of at least a plurality of years, and for adjusting the first predetermined criterion based on the registrations over said plurality of years such that a degradation of the daylight sensor over said plurality of years is taken into account; for obtaining weather conditions and to perform the registering over time when the obtained weather conditions correspond to predetermined weather conditions; and for performing the adjusting based on the values registered for the predetermined weather conditions; for averaging the registered angles of the sun over a period of time to obtain an average value, and wherein the adjusting is based on changes of the average value over time.

18. The control system of claim 16, wherein the daylight sensor is provided in the luminaire such that a light receiving surface of the daylight sensor is oriented facing the sky.

19. The control system of claim 16, further comprising a GPS receiver, wherein the control device is configured to compute the angle of the sun based on data received by the GPS receiver.

20. A luminaire comprising an artificial light source, driving circuitry for driving the artificial light source, and the control system of claim 16, wherein the control device is configured for controlling the switching on and off of the luminaire by controlling the driving circuitry.

21. The control system of claim 16, wherein said control device is further configured to register over time, for at least one determined angle of the sun, at least one corresponding obtained light level.

* * * * *